D. E. NORLEEN.
APPARATUS FOR PASTEURIZING WHEY.
APPLICATION FILED AUG. 23, 1920.
1,390,308. Patented Sept. 13, 1921.
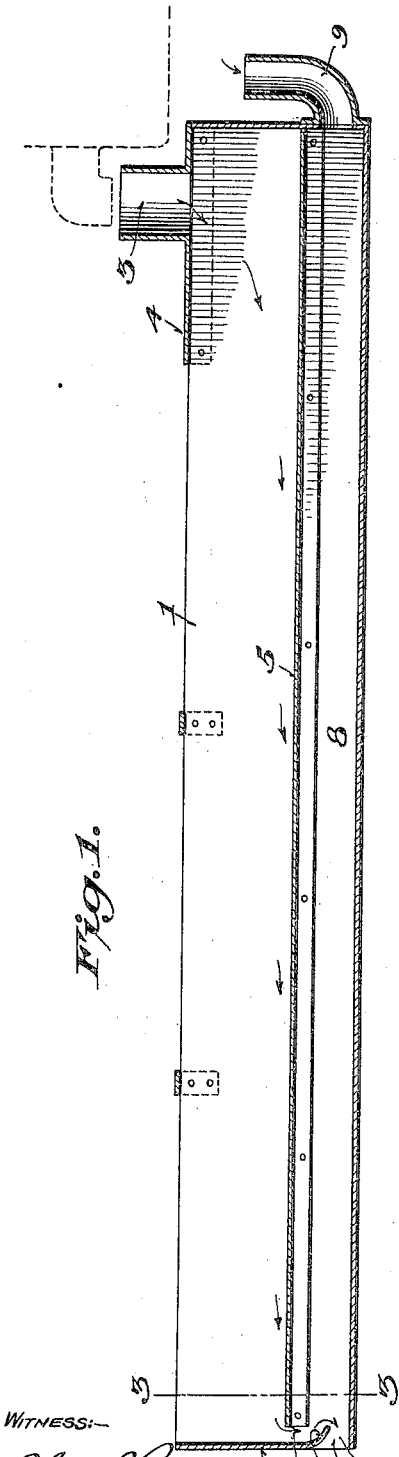
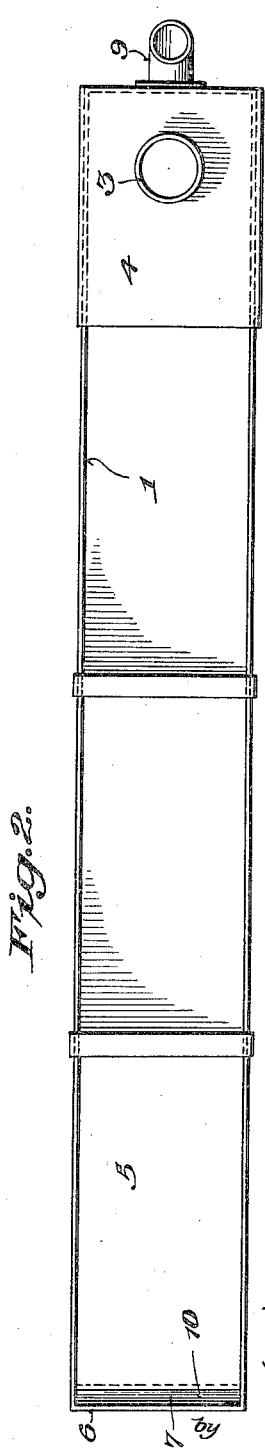
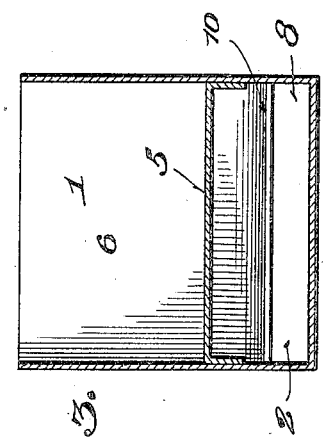
Inventor
David E. Norleen,

# UNITED STATES PATENT OFFICE.

DAVID E. NORLEEN, OF ABBOTSFORD, WISCONSIN.

APPARATUS FOR PASTEURIZING WHEY.

1,390,308.

Specification of Letters Patent. Patented Sept. 13, 1921.

Application filed August 23, 1920. Serial No. 405,225.

*To all whom it may concern:*

Be it known that I, DAVID E. NORLEEN, a citizen of the United States, residing at Abbotsford, in the county of Clark and State of Wisconsin, have invented new and useful Improvements in Apparatus for Pasteurizing Whey, of which the following is a specification.

The present invention relates to an improvement in apparatus for pasteurizing whey.

As is well known whey is largely employed as a food for live stock, particularly hogs, and the laws of several States require that every cheese factory shall pasteurize the whey produced therein, a heavy penalty being provided for violation of such requirement.

Among the particular objects of the present invention is the provision of an apparatus which can be manufactured and sold at a relatively low cost and that can be readily installed and connected with other apparatus in a cheese factory so that effective pasteurization of whey may be effected at a minimum expense. A further object of the invention is to provide an apparatus for the purpose described which will enable a cheese factory to comply fully with the requirements of law governing the pasteurization of whey and which can be operated with a minimum amount of attention.

In the accompanying drawing—

Figure 1 is a longitudinal sectional view through a whey pasteurizing apparatus constructed in accordance with the present invention;

Fig. 2 is a plan view;

Fig. 3 is a transverse section, on the line 3—3 of Fig. 1, on an enlarged scale.

Referring to the drawing the apparatus comprises essentially an elongated trough like body 1, which is provided with an outlet or discharge aperture 2 at one end, and to which the whey to be pasteurized is supplied adjacent the opposite end.

In the particular embodiment of the invention illustrated the whey is supplied through a short vertical inlet conduit 3 that extends through a plate 4 supported across the upper edges of the body 1 at the end thereof opposite that in which the outlet 2 is formed.

The inlet pipe or conduit 3 may be connected with the discharge of a whey separator, as diagrammatically represented in Fig. 1 or the whey may be supplied to such inlet in any other suitable manner.

It is preferred to connect the inlet 3 with the discharge means of a whey separator, or position the apparatus so that whey from such separator can pass directly to the trough-like body 1 because the exhaust steam from the engine employed to drive the separator can be thus easily employed for effecting the desired pasteurization. However, the steam for heating the whey to the desired temperature may be obtained from any suitable source.

Within the body 1 is arranged a false bottom 5 that extends practically throughout the length thereof, being separated from the end wall 6, in which the outlet 2 is formed, to provide a passage 7 through which whey can pass to the relatively shallow heating duct 8 that connects the outlet 2 with a pipe 9 through which the heating medium, for instance exhaust steam, is supplied.

As shown in the drawing the heating duct 8 along the bottom of the whey receptacle is of slight depth and extends throughout the width of the body 1 so that all parts of the lower surface of the false bottom 5 will be subjected to the action of the steam and the whey raised to a pasteurizing temperature in passing from the inlet 3 to the passage 7 and the steam is caused to pass through the outlet 2 with the whey.

To assist in obtaining the desired intimate contact of the whey and heating medium just prior to its being discharged through the inlet 2 the upper edge of said outlet is deflected inward and downward into the heating conduit, as shown at 10. The lip or deflector 10, it will be seen, acts to direct the stream of whey passing through the passage 7 slightly toward the opposite end of the apparatus and against the stream of exhaust steam and as the whey passes downward across the free end of said lip it will be moving transverse to the stream of steam so that the latter will tend to flow through the whey as it is discharged from the outlet 2.

As the outlet 2 is of less cross sectional area than the heating duct 8 the lip 10 acts to slightly check the free flow of steam through the duct and cause the maximum heating effect thereof to be exerted on the bottom 5.

In operation the whey received through the inlet 3 will flow in a relatively thin layer over the heated bottom 5 and finally as it passes through the outlet 2 be exposed to direct contact with the heating medium. As before stated the heat may be obtained from the exhaust steam of a whey separator so that the operation of the apparatus will involve a minimum expense. By varying the inclination of the apparatus the temperature to which the whey is raised may be varied to a considerable extent as may be found desirable.

It will be appreciated that the apparatus comprises a minimum number of parts, is cheap of manufacture and that all portions thereof can be readily cleaned and maintained in sanitary condition. The false bottom 5 divides the body into two superposed chambers that communicate only adjacent the end wall in which the outlet 2 is formed. The deflector or lip 10 is of such length that it extends across the opening through which the two chambers communicate so that all portions of the stream of whey flowing through said opening will be brought directly into the path of the exhaust steam in reaching the outlet 2.

It will of course be understood that the embodiment of the invention hereinbefore particularly described and shown in the drawing has been selected merely for purposes of illustration and not as a limitation of the invention. There can of course be considerable variation in the form and proportion of parts etc., without departing from the invention.

Having thus described the invention what is desired to be secured by Letters Patent is:

1. The herein described apparatus for pasteurizing whey consisting of a receptacle having an outlet at one end adjacent its bottom, an imperforate false bottom arranged above the plane of said outlet and extending from the opposite end of the receptacle to within a short distance of the wall in which the outlet is formed, a deflector extending into the space between the bottoms of the receptacle, above the outlet and in the path of whey flowing through the passage between the false bottom and the end wall in which the outlet is formed, and means for supplying a heating medium to the space between the bottoms of the receptacle.

2. The herein described apparatus for pasteurizing whey, consisting of a receptacle divided into two superposed chambers communicating at one end of the upper chamber, the lower chamber being provided with an inlet for a heating medium and having an outlet at its end adjacent the passage connecting it with the upper chamber, and means within the lower chamber extending into the path of whey flowing through the passage connecting the chambers for deflecting the whey toward the inlet for the heating medium.

In testimony whereof I have hereunto set my hand.

DAVID E. NORLEEN.